United States Patent [19]

de Lima Castro Netto

[11] Patent Number: 4,466,160

[45] Date of Patent: Aug. 21, 1984

[54] INTEGRAL BAG CLOSURE

[76] Inventor: Eduardo de Lima Castro Netto, Rua São Luiz Gonzaga No. 912, Rio de Janeiro, Brazil

[21] Appl. No.: 227,125

[22] Filed: Jan. 22, 1981

[51] Int. Cl.³ .................... B65D 77/10; B65D 33/30
[52] U.S. Cl. .................................... 24/30.5 R; 24/273
[58] Field of Search ............... 24/16 PB, 17 A, 17 B, 24/17 AP, 30.5 R, 30.5 S, 30.5 P, 273

[56] References Cited

U.S. PATENT DOCUMENTS

1,388,735  8/1921  MacDonald et al. .......... 24/30.5 R
1,776,050  9/1930  Szöke ........................... 24/30.5 R
3,242,542  3/1966  Tako ............................... 24/273 X
3,475,264  10/1969  Donaldson ................... 24/16 PB X

Primary Examiner—Robert P. Swiatek
Attorney, Agent, or Firm—Beveridge, DeGrandi and Kline

[57] ABSTRACT

An integrally formed bag closure is described in which a band passed round the neck of a bag is drawn tight by a lever arrangement, the lever and band being secured by a resilient latch. Embodiments of the closure are described in which the latch is inaccessible after closing, in order that the closure should function as an inviolable security seal. Re-usable closures having their latches disengageable are also described.

29 Claims, 7 Drawing Figures

INTEGRAL BAG CLOSURE

BACKGROUND OF THE INVENTION

The invention concerns devices for closing and sealing bags and is directed to a means for tightly closing the neck of a bag without the use of tensioning tools. A preferred embodiment of the invention is a security seal which tightly closes the neck of a bag and is not removable therefrom except by damaging the seal.

Known bag closures include conventionally a band which is passed round the neck of the bag and is then drawn tight. The ends of the band are then secured, or in situations where tamper-proofing is required, immobilized by conventional lead or wax or other seal means. Unfortunately, previous security seals of this type have failed to provide a sufficient degree of security because of the difficulty in maintaining the tension in the band while the seal is applied without using tools or external mechanical devices.

The present invention seeks to provide an integral, disposable closure for a bag, which can exert and maintain a high tension in a band passed round the bag neck. The closure of the present invention can simply be made adjustable, to tolerate various bag sizes, and inviolable to perform a security function.

SUMMARY OF THE INVENTION

According to the present invention, an integral closure device for a bag is characterized in that it comprises a main part, a lever member, and an elongated band, the main part having a bag-engaging surface and the lever member being pivotally associable with the main part for movement between a first position adjacent the bag-engaging surface and a second position remote therefrom, the device further including resilient latching means operative between the lever member and the main part when the lever member is in its second position, at least one end of the elongated band being integrally attached either to the lever member or to the main part and means being provided to fix another point along its length to either the main part or the lever member, the band extending across the bag-engaging surface to define a closed loop therewith when it is so fixed and the lever member is associated with the main part, movement of the lever from the first position to the second position serving to decrease the circumference of said loop.

The preferred embodiment of the device has the main part positioned centrally, the lever member attached integrally thereto via a hinge, and the band attached integrally to the central part remote from the hinge. Between the hinge and the attachment of the band is situated the bag-engaging surface. Spaced along the band are abutments copperable with a complementary formation on the lever member to secure the band thereto at one of a number of points along the length of the band.

The preferred device of the present invention thus combines ease of application with a tight grip on the bag neck. To apply the device, the lever member is put in its first position adjacent the bag-engaging surface of the main part of the seal. The neck of the bag is gathered to the bag-engaging surface, and the free end of the band is passed round the gathered neck and pulled tight, whereupon it is fixed in place in the complementary formation so that the bag neck is encircled on one side by the band and on the other side by the bag-engaging surface of the main part of the seal. The seal is finally tightened by moving the lever to its second position, thereby pulling the band tightly round the bag neck using the mechanical advantage of the lever. When the lever reaches its second position, the latching means engage to hold the device closed.

BRIEF DESCRIPTION OF THE DRAWINGS

A device according to the present invention, which is a security seal, will now be described with reference to the accompanying drawings, in which.

Figure 1:
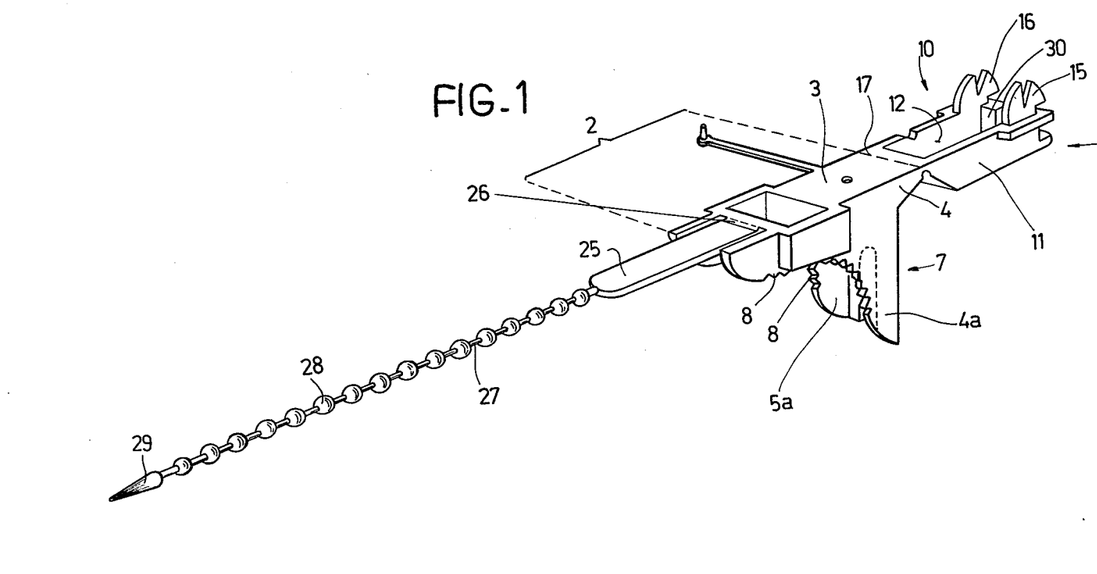
FIG. 1 is a perspective view of the seal in its as-molded configuration.
Figure 2:
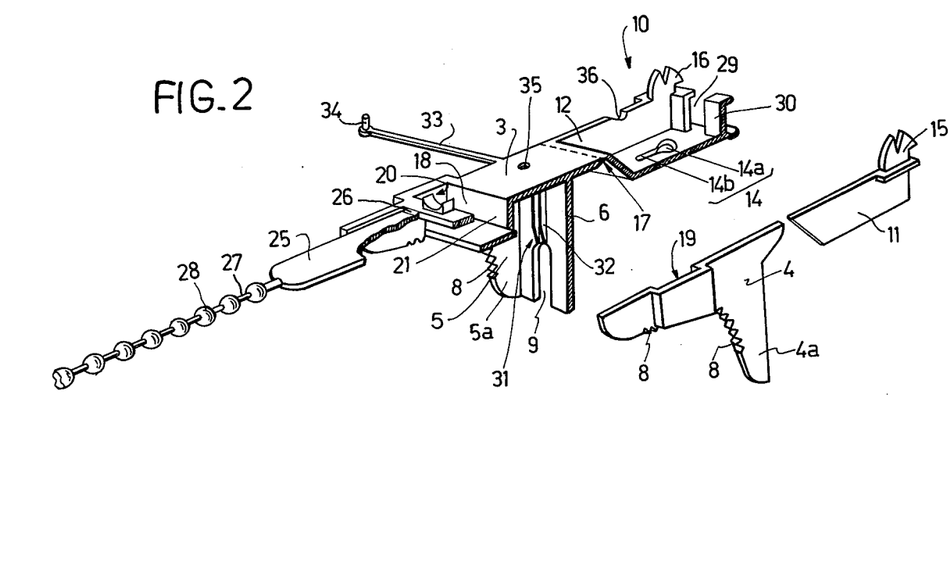
FIG. 2 shows a view similar to FIG. 1 but which has part cut away to show interior details.

As is clear from FIGS. 1 and 2, the seal 1 includes a main part 2 which is composed of an elongate inverted channel having a web 3 and flanges 4 and 5.

Flanges 4 and 5 have extensions 4a, 5a away from the web 3 and provided with a transverse wall 6, forming an arm 7 of channel section projecting downwardly from the main part 2. The flanges 4 and 5, where they join extensions 4a and 5a remote from the transverse wall 6, are curved and formed with notches to define two series of teeth 8 along the edges of flanges 4, 5, and extensions 4a, 5a. The transverse wall 6 is formed wih a longitudinal slot 9 for part of its length, the slot being open at the free end of the transverse wall 6.

Hingedly attached to the web 3 of main part 2, at its end nearest the arm 7, is a lever member 10 which is of channel section and is open upwards in the condition shown in FIGS. 1 and 2. From this position it may be swung downward to lie beside the arm 7, or upward to overlie the main part 2 of the seal 1, pivoting about an integral hinge 17.

The lever member 10 as two sidewalls 11, 12 spaced apart so as to be coplanar with flanges 4 and 5, respectively. Joining the sidewalls 11 and 12 is a base 13 which includes a keyhole slot 14. The keyhole slot 14 has a wider part 14a nearer the free end of the lever member, and a narrowed part 14b extending longitudinally of the lever towards the hinge 17. Positioned on the sidewalls 11, 12 to be coplanar therewith at the free end of the lever member 10 is a pair of resilient hook portions 15 and 16.

The main part 2 is formed at its end remote from the hinge 17 with an upwardly open chamber 18, the chamber having an internal lateral dimension equal to the external lateral dimension of the remainder of the main part 2 and the lever member 10. This is achieved by positioning the end walls 19 and 20 of the chamber beyond the flanges 4 and 5 of the main part 2. The side of the chamber 18 nearest the hinge 17 is closed by a wall 21, and the base of the chamber is completely closed by a floor 22 which extends from the wall 21. The chamber 18 is also provided with downwardly facing detent surfaces 23 best seen in FIG. 3, which are situated beneath the ends of a transverse bar 24 which is positioned between flanges 4 and 5 coplanar with web 3, and extends to contact end walls 19 and 20 of the chamber 18. Clearly, to form the chamber 18 and the detent surfaces 23, a mold which is provided with an expanding core may be required.

Extending from the bar 24 away from the chamber 18 is a tab 25, connected to the bar 24 by hinge 26. At the end of tab 25 remote from the hinge 26 extends a filament 27, formed with spherical enlargements 28 at a plurality of points along its length and terminating in a conical spear point 29.

Operation of the seal is simple, in that the neck of the bag to be sealed is first gathered and is then pressed into contact with the teeth 8 of the seal. The lever member 10 of the seal is hinged to lie alongside the arm 7 so that the keyhole slot 14 and the slot 9 in the arm are adjacent. The spear point 29 of the filament 27 is then brought round the neck of the bag and is inserted through both the slot 9 and the larger part 14a of the keyhole slot 14, after which the end of the filament is pulled through these slots until it is reasonably tight.

The free end of the filament is then urged towards the main part 2, so that a part of the filament 27 enters the thinner part 14b of the keyhole slot, whereupon axial movement of the filament 27 relative to the lever 10 is prevented by the spherical enlargements 28 positioned on the filament 27 abutting the base 13 of the lever member adjacent the narrower part 14b of keyhole slot 14.

Finally, lever member 10 is brought round to its final position where it overlies the main part 2 of the seal. It will be apparent that, during this movement of the lever, the filament 27 and its enlargements 28 are drawn through the slot 9 in the arm 7 by a predetermined amount, thus placing the filament 27 under great tension, greater tension than can be obtained by simple pulling by hand.

When the lever member overlies the main part 2, slight further pressure causes the hooks 15 and 16 to enter the lateral extremities of the chamber 18 and engage beneath detent surfaces 23, thus securing the lever member in position. While the filament is drawn tight, the tab 25 is hinged downwardly from the position shown in FIG. 1, so that it effectively closes the open side of the chamber 18, opposite wall 21, and thus access to the chamber from below is prevented.

During closing of the seal, the free end of the filament is laid within the lever member and extends through an opening 29 in an end wall 30 of the lever extending between the hooks 15 and 16. The opening 29 is formed to surround closely one of the enlargements 28, and the distance between the end of the narrow portion 14b of keyhole slot 14 and the opening 29 is so adjusted that an enlargement 28 is positioned in the opening 29 when the seal is closed. To conform to the enlargement 28, the opening 29 may have a semicircular end wall nearest the base 13 of the lever member, and a matching projection with a concave semicircular upper edge may be provided on the upper surface of bar 24, so that when the seal is closed only a circular opening remans, closely filled by one of the enlargements 28.

Figure 3:
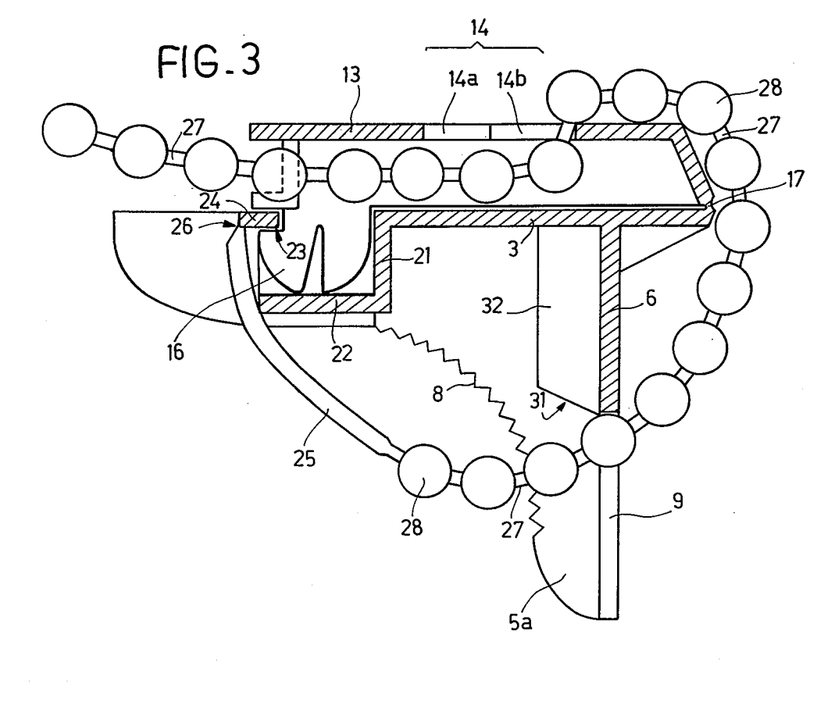
FIG. 3 is a sectional view showing the seal in its closed position.
Figure 4:
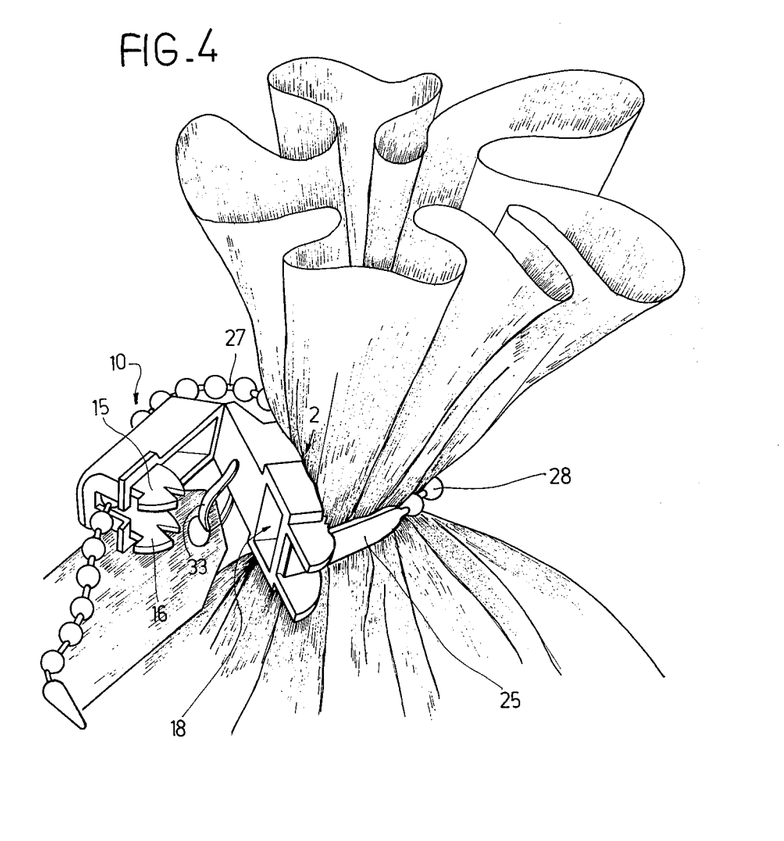
FIGS. 4 and 5 are, respectively, views showing the seal applied to a bag, firstly just before sealing, and secondly in the sealed condition.
Figure 5:
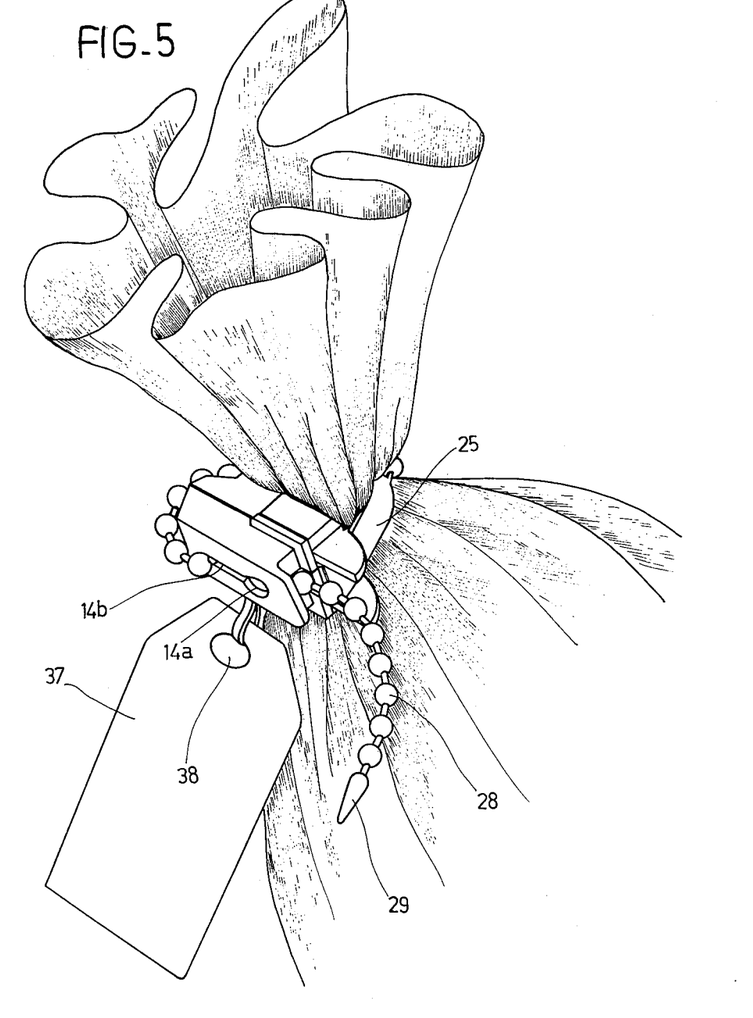

As the seal is closed, the filament 27 and its enlargements 28 are pulled through the slot 9 in the arm 7, to tighten the filament about the neck of the bag. It is foreseen that the curved end surface of the slot 9 may enter between two of the projections and thus interfere with the tightening movement of the filament. To avoid this, guide surfaces 31 may be provided on the ends of small ribs 32 extending along the transverse wall 6 of the arm 7 between the flanges 4a and 5a. These guide surfaces and ribs are illustrated in FIGS. 2 and 3, two ribs 32 being shown. It may be desirable to provide a single rib, or a plurality of ribs depending on the exact geometry of the end surface of slot 9.

In order to withstand the high tension imparted to it by the action of lever member 10, the filament 27 may be reinforced with an insert of resistant material molded therein. The insert is preferably a metal wire suitably proportioned and finished to prevent slippage of the enlargements 2 relative to the wire, and is preferably anchored within the tab 25. Alternatively the insert may be of glass fibers or any other suitable material.

A further optional feature of the seal is a label-holding strap 33, extending laterally from one side of the main part 2 of the seal. The strap 33 is provided at its free end with a pin 34, which is insertable prior to closing the seal in an aperture 35 formed in the web 3 of the main part 2. A cutout 36 is formed on the sidewall 12 of the lever adjacent the strap, and it is through this cutout that the strap will pass when the seal is closed. To attach a label to the seal, the end of the strap is first passed through a hole in the label, and the pin 34 is then inserted in aperture 35. The seal is then closed, and the strap 33 is retained in position by lever member 10.

Figure 6:
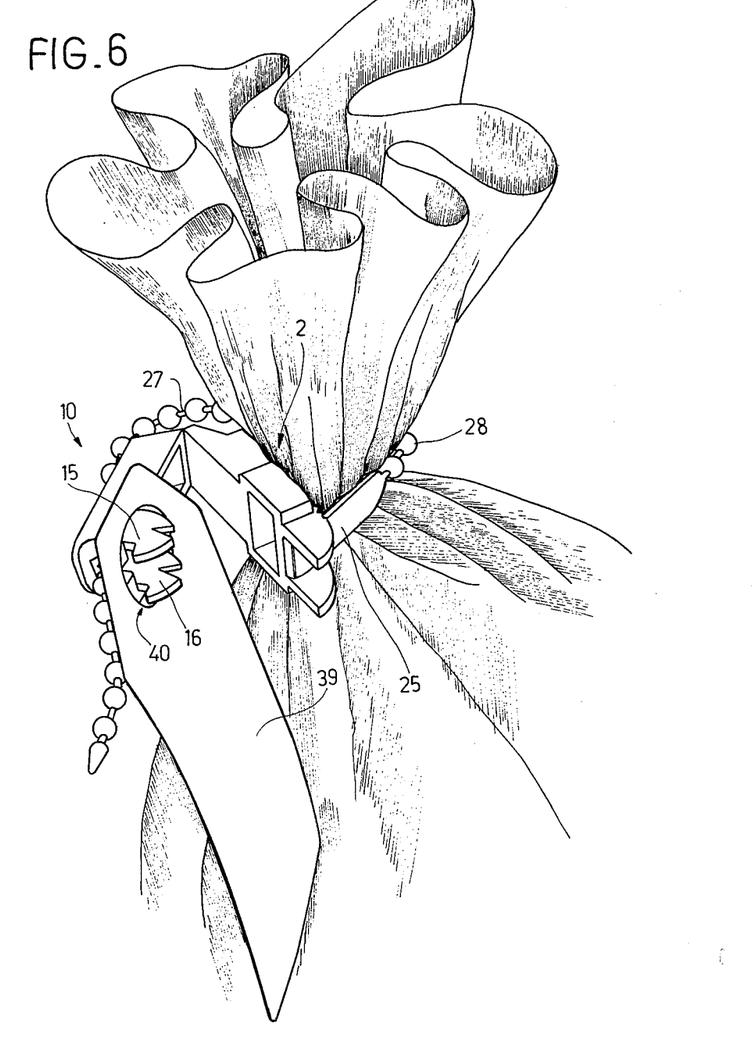
FIGS. 6 and 7 are views similar to FIGS. 4 and 5 showing an alternative method of fixing a label to the seal.
Figure 7:
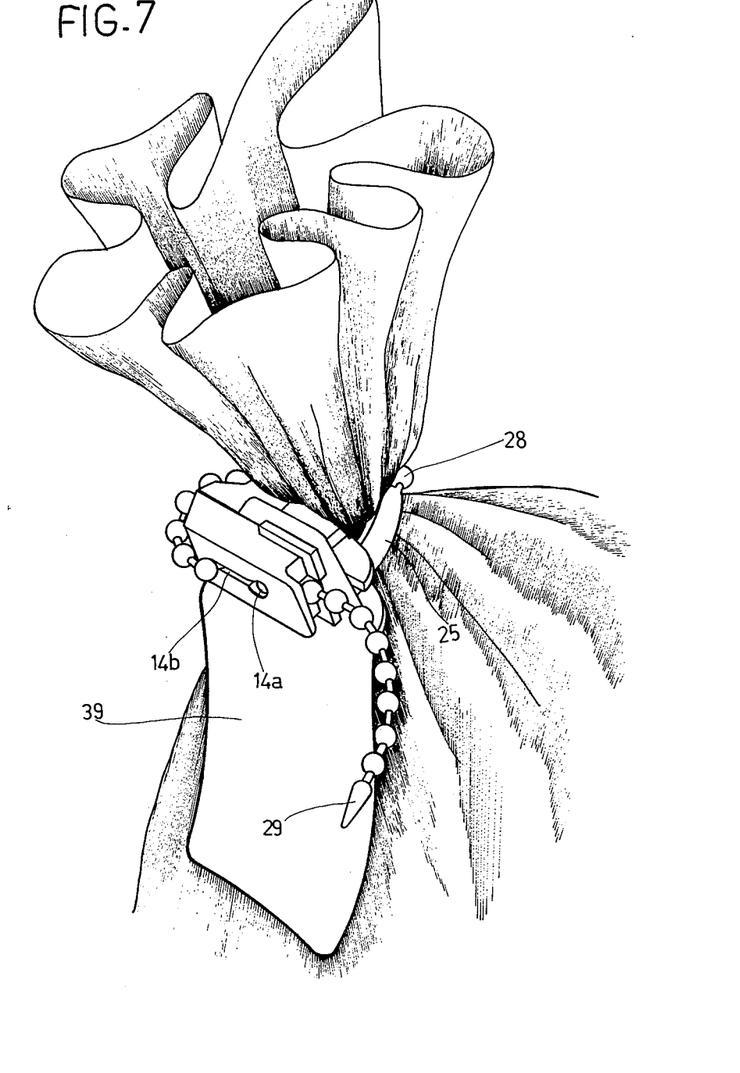

Alternatively, a label may be positioned between the lever member 10 and the main part 2, the resilient hooks either forming, or passing through, a preformed hole in the label. This arrangement is shown in FIGS. 6 and 7, with the seal on the point of closing and closed, respectively.

Numerous changes in design will be apparent to those skilled in the art, for example, the filament may have any desired form provided that it has spaced along its length points for attaching it to the central part and the lever member. In an alternative design it is evisaged that the filament may be integrally formed with the lever member, and a formation will then be provided on the central part to fix the filament thereto at a point on its length.

The filament may have abutments formed by external enlargements, as in the described embodiment, or may be a flat band formed with apertures to resemble a ladder. Clearly, the formation which engages the filament must be appropriately formed to cooperate therewith.

A further alternative design intended to be within the scope of the present invention is a seal in which the lever member 10 and main part 2 are both integrally joined to the band, at its respective ends. In this configuration the main part and lever member will be provided with bearing surfaces cooperable to form a fulcrum so that in operation the bag is gathered to the bag-engaging surface of the main part, the lever member and band are then passed around the neck of the bag and the bearing surface of the lever member is fitted to that of the main part with the lever member in a first position relative thereto. Subsequent rotation of the lever member to a second position in which it is latched to the main part will draw the band tightly round the neck of the bag.

Clearly, the seal described immediately above will not have the tolerance to accommodate widely differing bag sizes that the preferred embodiment has, but nevertheless may be used when identical bags require sealing in quantity.

The seal is described as an integral unit and is thereby made particularly suitable to formation by injection molding techniques from any suitable resistant plastics material.

In the preferred embodiment, the seal is usable in security applications as it cannot be opened without damage, a property arising from the fact that access to the latching hooks 15 and 16 is prevented by the configuration of the seal. The present invention also contemplates bag closures of a re-usable type which can tightly secure the neck of a bag, the closures being made so that the latching devices used to retain the lever member in the closed position may be repeatedly released and thereafter re-closed. Such a closure will find utility in the packaging industry, for example.

I claim:

1. An integrally formed closure device for a bag, comprising a main part, a lever member, and an elongated band, the main part having a bag-engaging surface and the lever member being pivotally associable with the main part for movement between a first position adjacent the bag-engaging surface and a second position remote therefrom, the closure device further including resilient latching means operative between the lever member and the main part when the lever member is in the second position; said main part, said lever member, said elongated band and said latching means all being portions of an integral body of plastic material; at least one end of the elongated band being permanently attached to the main part, and attachment means comprising a closed slot being provided intermediate of the ends of the lever member to fix another point along the length of the band to the lever member, the band extending across the bag-engaging surface to define a closed loop therewith when it is so fixed and the lever member is associated with the main part, movement of the lever member from the first position to the second position serving to decrease the circumference of said loop.

2. An adjustable integral closure device according to claim 1, characterized in that the band is permanently attached only at one end to the main part of the closure, and has a plurality of abutments spaced along its length, the abutments being cooperable with said attachment means situated on the the lever member of the closure device, the lever member being permanently joined to the main part via a hinge.

3. An adjustable integral closure device according to claim 2, characterized in that the band comprises a filament provided along its length with a plurality of enlargements, and in that the complementary formation is a keyhole slot having a large part through which the enlargements may pass, and a narrow part through which the enlargements may not pass.

4. An integral closure device according to claim 1 characterized in that the band is attached integrally to the main part of the closure by means of a hinged tab.

5. An integral closure device according to claim 1 characterized in that the resilient latching means comprise one or more resilient hooks, which engage corresponding detent surfaces to prevent the lever member from leaving the second position.

6. A closure device for a bag according to claim 1, in which access is available to the resilient latching means when the lever member is in the second position, enabling the closure device to be removed undamaged from a bag, for re-use.

7. A closure device for a bag, according to claim 1, characterizied in that access to the resilient latching means is unavailable when the lever member is in the second position, the closure member thus comprising a security seal.

8. An integral closure device according to claim 7, characterized in that the hook portions are situated on the lever member and engage a detent surface provided in an open-sided recess in the main part of the seal, the open side of the recess being closed by the tab when the seal is in use.

9. An integral closure device according to claim 1 characterized in that the main part is an inverted channel section having a web and flanges, the flanges being extended downwardly and provided with a transverse wall to form an arm of channel section, the edges of the extended flanges remote from the transverse wall being serrated to form bag-engaging surfaces.

10. An integral closure device according to claim 9, characterized in that the lever member is attached to the web of the main part adjacent its junction with the transverse wall, the lever member being capable of motion from a first position in which it lies parallel to and adjacent the transverse wall to a second position in which it lies parallel and adjacent to the web of the main part.

11. An integral closure device according to claim 10, characterized in that the band comprises a filament provided along its length with a plurality of enlargements, and in that the attachment means is a keyhole slot having a large part through which the enlargements may pass, and a narrow part through which the enlargements may not pass; the lever member is of channel section, having a base and sidewalls, and when in the second position overlies the web of the main part to define a closed space between the web, base and sidewalls, the filament entering the closed space via the keyhole slot formed in the base of the lever and leaving the closed space via an opening in an end wall of the lever.

12. An integral closure device according to claim 11, characterized in that the opening closely surrounds an enlargement of the filament, and is blocked thereby.

13. An integral closure device according to claim 11, in which the opening is defined partially by the end surface of a slot in the end wall, and partially by the extremity of a projection situated on the web of the main part and which enters the slot when the lever is in its second position.

14. An integral closure device according to claim 1 characterized in that the band is reinforced by an insert of high-strength material.

15. An integral closure device according to claim 14 characterized in that the insert is metallic.

16. An integral closure device according to claim 1 characterized in that the device includes label-holding means comprising a strap extending laterally of the main part and terminating at a pin, the main part being formed with an opening in which the pin is receivable to form a label-retaining bight in the strap.

17. An integral closure device according to claim 1, characterized in that it is adapted to retain a label by trapping said label between the lever member and the main part when the lever member is in its second position, the resilient latching means passing through a hole in the label.

18. An integral closure device according to claim 17, characterized in that the hole in the label is formed by the resilient latching means.

19. A closure device according to claim 1 wherein, when the band defines a closed loop and the lever is held in its second position by the resilient latching means, the band is connected to the lever at a point which lies between the resilient latching means and the point where said lever is pivotally associated with the main part.

20. An integrally formed closure device for a bag, comprising a main part, a lever member, and an elongated band, the main part having a bag-engaging surface and the lever member being permanently joined to the main part via a hinge for movement between a first position adjacent the bag-engaging surface and a second position remote therefrom, the closure device further including resilient latching means operative between the lever member and the main part when the lever member is in the second position; said main part, said lever member, said elongated band and said latching means all being portions of an integral body of plastic material; said elongated band being permanently attached only at one end to one of the lever member and the main part, and attachment means being provided to fix another point along the length of the band to the other of the main part and the lever member, said band comprising a filament provided along its length with a plurality of enlargements, said attachment means comprising a keyhole slot having a large part through which said enlargements may pass and a narrow part through which the enlargements may not pass, the band extending across the bag-engaging surface to define a closed loop therewith when it is so fixed and the lever member is associated with the main part, movement of the lever member from the first position to the second position serving to decrease the circumference of said loop.

21. An integrally formed closure device for a bag, a main part, a lever member, and an elongated band, said main part comprising an inverted channel section having a web and flanges which extend downwardly, a transverse wall connected to said flanges to form an arm of channel section, said extended flanges having serrated edges which are remote from the transverse wall to form bag-engaging surfaces, said lever member being pivotally associable with the main part for movement between a first position adjacent the bag-engaging surface and a second position remote therefrom, the closure device further including resilient latching means operative between the lever member and the main part when the lever member is in the second position; said main part, said lever member, said elongated band and said latching means all being portions of an integral body of plastic material; at least one end of the elongated band being permanently attached to one of the lever member and the main part, and attachment means being provided to fix another point along the length of the band to the other of the main part and the lever member, the band extending across the bag-engaging surface to define a closed loop therewith when it is so fixed and the lever member is associated with the main part, movement of the lever member from the first position to the second position serving to decrease the circumference of said loop.

22. An integral closure device according to claim 21 wherein the lever member is attached to the web of the main part adjacent its junction with the transverse wall, the lever member having its first position lying parallel to and adjacent the transverse wall and its second position lying parallel and adjacent to the web of the main part.

23. An integral closure device according to claim 22, characterized in that the band comprises a filament provided along its length with a plurality of enlargements, and in that the attachment means is a keyhole slot having a large part through which the enlargements may pass, and a narrow part through which the enlargements may not pass; said lever member having a base and sidewalls forming a channel section which, when the lever is in the second position, overlies the web of the main part to define a closed space between the web, base and sidewalls, said lever having an end wall having an opening therein, said keyhole slot being formed in the base of the lever, the filament entering the closed space via the keyhole slot formed in the base of the lever and leaving the closed space via said opening in an end wall of the lever.

24. An integral closure device according to claim 23, characterized in that the opening closely surrounds an enlargement of the filament, and is blocked thereby.

25. An integral closure device according to claim 23, in which the opening is defined partially by the end surface of a slot in the end wall, and partially by the extremity of a projection situated on the web of the main part and which enters the slot when the lever is in its second position.

26. An integrally formed closure device for a bag, comprising a main part, a lever member, and an elongated band, the main part having a bag-engaging surface and the lever member being pivotally associable with the main part for movement between a first position adjacent the bag-engaging surface and a second position remote therefrom, the closure device further including resilient latching means operative between the lever member and the main part when the lever member is in the second position; said main part, said lever member, said elongated band and said latching means all being portions of an integral body of plastic material; at least one end of the elongated band being permanently attached to one of the lever member and the main part, and attachment means being provided to fix another point along the length of the band to the other of the main part and the lever member, the band extending across the bag-engaging surface to define a closed loop therewith when it is so fixed and the lever member is associated with the main part, movement of the lever member from the first position to the second position serving to decrease the circumference of said loop, means for preventing access to the resilient latching means when the lever member is in the second position, said closure device thus comprising a security seal.

27. A closure device according to claim 26 wherein said resilient latching means comprises hook portions situated on the lever member, said main part having an open-sided recess with a detent surface engageable by said hook portions, said device having a tab which closes the open side of the recess when the seal is in use.

28. An integrally formed closure device for a bag, comprising a main part, a lever member, and an elongated band, the main part having a bag-engaging surface and the lever member being pivotally associable with the main part for movement between a first position adjacent the bag-engaging surface and a second position remote therefrom, the closure device further including resilient latching means operative between the lever member and the main part when the lever member is in the second position; said main part, said lever member, said elongated band and said latching means all being portions of an integral body of plastic material; at least one end of the elongated band being permanently attached to one of the lever member and the main part, and attachment means being provided to fix another point along the length of the band to the other of the main part and the lever member, the band extending across the bag-engaging surface to define a closed loop therewith when it is so fixed and the lever member is associated with the main part, movement of the lever member from the first position to the second position serving to decrease the circumference of said loop, and a label holding means comprising a strap which extends laterally of the main part and terminates at a pin, said main part having an opening in which the pin is receivable to form a label-retaining bight in the strap.

29. An integrally formed closure device for a bag, comprising a main part, a lever member, and an elongated band, the main part having a bag-engaging surface and the lever member being pivotally associable with the main part for movement between a first position adjacent the bag-engaging surface and a second position remote therefrom, the closure device further including resilient latching means operative between the lever member and the main part when the lever member is in the second position, said lever being held in its second position by the resilient latching means; said main part, said lever member, said elongated band and said latching means all being portions of an integral body of plastic material; at least one end of the elongated band being permanently attached to one of the lever member and the main part, and attachment means being provided to fix the band to the other of the main part and the lever member at a point which lies between the resilient latching means and the point where said lever is pivotally associated with the main part, the band extending across the bag-engaging surface to define a closed loop, movement of the lever member from the first position to the second position serving to decrease the circumference of said loop.

* * * * *